US006358304B1

(12) United States Patent
Kapoor

(10) Patent No.: US 6,358,304 B1
(45) Date of Patent: Mar. 19, 2002

(54) INK WITH FLOW CHARACTERISTICS

(75) Inventor: Sain D. Kapoor, Tucson, AZ (US)

(73) Assignee: Uhlich Color Company, Inc., Tucson, AZ (US)

( * ) Notice: Subject to any disclaimer, the term of this patent is extended or adjusted under 35 U.S.C. 154(b) by 0 days.

(21) Appl. No.: 09/314,797

(22) Filed: May 18, 1999

(51) Int. Cl.$^7$ .............................................. C09D 11/00
(52) U.S. Cl. .................. 106/31.86; 106/31.6; 106/31.8; 106/31.81; 106/31.75; 106/493; 106/496; 106/497; 106/498; 106/505
(58) Field of Search .......................... 106/31.86, 31.6, 106/31.75, 31.8, 31.81, 413, 493, 496, 497, 498, 505

(56) References Cited

U.S. PATENT DOCUMENTS

| | | | |
|---|---|---|---|
| 3,725,101 A | | 4/1973 | Kuhne et al. ................ 106/494 |
| 3,759,731 A | | 9/1973 | Kuhne et al. ............. 106/31.78 |
| 3,759,733 A | | 9/1973 | Bradley et al. .............. 106/496 |
| 3,775,148 A | | 11/1973 | Bradley ....................... 106/496 |
| 4,404,271 A | | 9/1983 | Kawagishi et al. ......... 430/110 |
| 4,407,924 A | | 10/1983 | Senshu et al. .............. 430/109 |
| 4,468,255 A | | 8/1984 | Schwartz et al. ........... 106/494 |
| 4,474,609 A | | 10/1984 | Ehl et al. .................... 106/494 |
| 4,535,151 A | * | 8/1985 | Forunier ..................... 534/739 |
| 4,656,112 A | | 4/1987 | Kawagishi et al. ......... 430/110 |
| 4,720,304 A | | 1/1988 | Ruff et al. ................... 106/494 |
| 4,946,508 A | | 8/1990 | Schwartz et al. ........... 106/496 |
| 5,143,809 A | | 9/1992 | Kaneko et al. ............. 430/105 |
| 5,223,368 A | | 6/1993 | Ciccarelli et al. ........... 430/110 |
| 5,225,300 A | * | 7/1993 | Tsubota et al. ............. 430/106 |
| 5,383,966 A | * | 1/1995 | Johnson ...................... 106/505 |
| 5,393,632 A | | 2/1995 | Ciccarelli et al. ........... 430/110 |
| 5,403,690 A | | 4/1995 | Kuramoto et al. .......... 430/110 |
| 5,440,060 A | * | 8/1995 | Uhrig et al. ................. 559/107 |
| 5,472,490 A | * | 12/1995 | Sawamura et al. ......... 106/413 |
| 5,591,257 A | | 1/1997 | Weide et al. ................ 106/496 |

FOREIGN PATENT DOCUMENTS

| | | |
|---|---|---|
| DE | 1155755 | 5/1960 |
| GB | 1339068 | 4/1971 |
| GB | 1566803 | 6/1976 |
| JP | 01/266168 | * 10/1989 |
| JP | 05/043829 | * 2/1993 |

OTHER PUBLICATIONS

Derwent abstrat of JP05/043829, Feb. 1993.*
Derwent abstract of JP01/266168, Oct. 1989.*
J. Griffiths, *Colour and Constitution of Organic Molecules,* Academic Press, London (1976) pp. 125–133, No Month Available.
P. F. Gordon, *Organic Chemistry in Colour,* Springer–Verlag, Berlin (1983) pp. 23–24, 95–162, No Month Available.
R. H. Leach, editor, *The Printing Ink Manual,* 4$^{th}$ Edition, Van Nostrand Reinhold (International) Co. Ltd., London (1988) pp. 282–591, No Month Available.
C. H. Hare, *Protective Coatings,* Technology Publishing Co., Pittsburgh (1994), pp. 63–288, No Month Available.
H. Zollinger, *Color Chemistry,* VCH, Weinheim, 1987, pp. 85–148, No Month Available.
P. Gregory, *High–Technology Applications of Organic Colorants,* Plenum Press, New York (1991) pp. 9–13,, 29–32, 194–202, No Month Available.
English translation of JP05/043829, Feb. 1993.*

* cited by examiner

*Primary Examiner*—Helene Klemanski
(74) *Attorney, Agent, or Firm*—David E. Rogers; Squire, Sanders & Dempsey L.L.P.

(57) ABSTRACT

A rheology-modified ink includes (1) an ink carrier, which is either aqueous-based or solvent-based, (2) an organic pigment, which is preferably an azo pigment of the type generally used with an aqueous-based ink carrier, and (3) a flow-modifier, which is a metal salt of either an aromatic carboxylic acid or an aromatic hydroxy carboxylic acid. Addition of the flow-modifier (also called a rheology-modifier) improves the dispersion of pigment within the aqueous-based carrier thereby improving the flow characteristic of the ink. Also disclosed is a pigment including a flow-modifier and a rheology-modified paint.

43 Claims, No Drawings

INK WITH FLOW CHARACTERISTICS

FIELD OF THE INVENTION

The present invention relates to inks with improved flow (or rheology) characteristics. More specifically, the invention relates to flow-modifying agents for solvent-based and water-based inks consisting of the metal salts of aromatic hydroxy carboxylic acids and aromatic carboxylic acids.

BACKGROUND OF THE INVENTION

Organic pigments have achieved great importance in the graphic art industry due to their tinctorial strength, brilliance, purity of shade and high transparency. Their tinctorial strength is due to the fact that the pigment particles have a large surface area, which is due to the small particle size of the pigment molecules. This same feature brings about physical chemical interaction of the pigments with the solvents and binders used during the manufacture of the printing inks in which relatively stable gel structures having correspondingly unfavorable rheological properties are formed. Poor rheological properties, for example, thick and thixotropic dispersions, are generally assumed to be related to flocculation of pigment particles.

In addition to poor rheology, flocculation causes a loss of gloss and color strength during the grinding stage in the preparation of inks and paint, and causes the dispersion (which includes the ink vehicle and the pigment dispersed therein) to become very thick and thixotropic thereby making the formulations difficult to handle. Formulations that are easier to work can be obtained by decreasing the pigment content but this obviously affects the through-put of ink for a given grinding capacity. This disadvantage has been disclosed several times in the art, for example by F. M. Smith in *Paint Manufacture*, August 1957, page 256 and G. Wormald in *Paint and Varnish Products*, April 1957, page 56.

There has been a growing tendency in the graphic arts industry towards the development of high-speed printing machines which require printing inks having high tinctorial strengths and very good flow properties for multi-color printing. For example, British Patent 1,138,465 relates to the addition of compounds containing basic groups. British Patent 1,339,068 discloses the acid derivatives of pigments. German Patent 1,155,755 teaches the after treatment of pigments with organic solvents. British Patent 1,356,254 discloses water-soluble dyes. U.S. Pat. No. 4,468,255 discloses pigment derivatives to improve rheology. British Patent 1,566,803 discloses ammonium salts of colored acids.

As used herein the term solvent refers to a volatile material, usually a liquid, that is capable of dissolving another substance, usually a solid to form a solution. In ink manufacturing, solvents are used to dissolve materials in the ink vehicle, let down (or reduce) the viscosity of the reactive vehicle, and assist in the blending of the vehicle and pigments. The term solvent as used herein does not include water or aqueous-based carriers or additives.

In the past, attempts to solve the problems associated with ink having poor rheological properties have primarily involved the addition of surfactants to improve the dispersibility of organic pigments in water-based ink carriers. Further, surfactants can cause undesirable properties in the dried ink. For example, dried ink that includes surfactants is usually more prone to running or smudging when it comes into contact with water.

The present inventor has discovered that the metal salts of aromatic hydroxy carboxylic acids or aromatic carboxylic acids, which are used as negative charge control agents in electro-photography, when added to organic pigments, lower the viscosity and improve the flow of water-based and solvent-based inks. The improved ink disclosed herein can utilize monoazo yellow or orange pigments, disazo pigments, βnaphthol and naphthol AS based pigments. Other pigments that may be used in the practice of the invention include: azo pigment lakes, benzimidazolones, disazo condensation pigments, metal complex, phthalocyanine blues and greens, quinacridones and other polycyclic pigments, basic dye toners, and others all of which are described in *Industrial Organic Pigments* by Herbst and Hunger.

SUMMARY OF THE INVENTION

To solve the problems with the prior art the present invention comprises (1) an ink vehicle, which is either solvent-based or aqueous-based, (2) a pigment, and (3) a flow-modifying agent, which is a metal salt of an aromatic carboxylic acid or an aromatic hydroxy carboxylic acid. The invention is also directed to a pigment for use in printing inks wherein the pigment includes a flow-modifying agent according to the invention.

DETAILED DESCRIPTION OF A PREFERRED EMBODIMENT

The present invention comprises (1) an ink vehicle, which can be either water-based or solvent-based, (2) a pigment, which is preferably an organic pigment and most preferably an azo pigment, and (3) a flow-modifying agent, which is a metal salt of an aromatic carboxylic acid or an aromatic hydroxy carboxylic acid. The improved pigments of the present invention may be used in inks or paints. With regards to inks, some respective formulations are disclosed in: R. H. Leach, editor, *The Printing Ink Manual*, Fourth Edition, Van Nostrand Reinhold (International) Co. Ltd., London (1988), particularly pages 282–591; and with regard to paints some formulations are disclosed in: C. H. Hare, *Protective Coatings*, Technology Publishing Co., Pittsburgh (1994), particularly pages 63–288. The foregoing references are hereby incorporated by reference herein for their teachings of ink and paint compositions, formulations and vehicles which may be utilized in the practice of this invention.

The improved ink disclosed herein can utilize any organic pigment. Organic pigments that may be used in practicing the invention are azo pigments (including monoazo pigments and disazo pigments), β-naphthol pigments, naphthol AS pigments, azo pigment lakes, benzimidazolone pigments, metal complex pigments, isoindolinone pigments, isoindoline pigments, polycyclic pigments, phthalocyanine pigments, quinacridone pigments, perylene pigments, perinone pigments, diketopyrrolo pyrrole (DPP) pigments, thioindigo pigments, anthrapyrimidine pigments, flavanthrone pigments, pyranthrone pigments, anthanthrone pigments, dioxazine pigments, triarylcarbonium pigments, and quinophthalone pigments. The molecular structures and the process for making these pigments are known to those skilled in the art. Such pigments are described in one or more of the following references: W. Herbst, K. Hunger, *Industrial Organic Pigments*, 2d (1997), P. F. Gordon, P. Gregory, *Organic Chemistry In Color* (Springer-Verlog 1982); H. Zollinger, *Color Chemistry* (VCH Verlegseselschaft MBH 1987); P. Gregory, *High-Technology Applications of Organic Colorants* (Plenum Press 1991); and J. Griffiths, *Colour and Constitution of Organic Molecules* (Academic Press 1976), the disclosures of which are incorporated herein by reference. Azo pigment preparations and their method of manufacture are also disclosed in U.S. Pat. No. 3,759,733; U.S. Pat. No. 3,725,101; U.S. Pat. No. 3,759,731; U.S. Pat. No. 3,775,148; U.S. Pat. No. 4,474,609; U.S. Pat. No. 4,720,304; U.S. Pat. No. 4,946,508; and U.S. Pat. No. 5,591,257, and a United States patent application Ser. No. 09/185,931 filed on Nov. 4, 1998, now U.S. Pat. No. 6,136,087 entitled Crystal Growth Inhibitor, the respective disclosures of which are incorporated herein by reference.

Virtually any metal and any aromatic hydroxy carboxylic acid or aromatic carboxylic acid can be used in the practice of the invention as long as the acid contains at least one aromatic molecule. Some metal salts that can be used in the practice of the invention, and their method of manufacture, are disclosed in the following U.S. Patents, the disclosures of which are incorporated herein by reference: U.S. Pat. No. 4,404,271; U.S. Pat. No. 4,407,924; U.S. Pat. No. 4,656,112; U.S. Pat. No. 5,143,809; U.S. Pat. No. 5,223,368; U.S. Pat. No. 5,393,632; and U.S. Pat. No. 5,403,690.

It will be appreciated that a metal salt of the present invention may include more than one metal and/or more than one acid group. If more than one acid group is included, the invention may include either a symmetrical metal complex wherein two identical acid groups are used or an asymmetrical complex wherein two different acid groups are used.

Generally, substituted or unsubstituted aromatic acids are preferred, such as salicylic acid, naphtoic acid, and painoic acid. These may be substituted with any molecule including an alkyl or an aralkyl group or an aliphatic carbon chain. Depending upon the valence of the metal used, an acid group is selected that has a corresponding counter ion.

Examples of useful acid groups for forming the metal salts of the invention are 2-hydroxy-3-naphthoic acid; alkyl $(C_4-C_9)$-2-hydroxy-3-naphthoic acid; 5,6,7,8-tetrahydro-2-hydroxy-3-naphthoic acid; alkyl $(C_4-C_9)$-5,6,7,8-tetrahydro-2-hydroxy-3-naphthoic acid; 1-hydroxy-2-naphthoic acid; alkyl $(C_4-C_9)$-1-hydroxy-2-naphthoic acid; 5,6,7,8-tetrahydro-1-hydroxy-2-naphthoic acid; alkyl $(C_4-C_9)$-salicylic acid; 3,5-dialkyl $(C_4-C_9)$-salicylic acid; 2-hydroxy-3-naphthoic acid; alkyl $(C_4-C_9)$-2-hydroxy-3-naphthoic acid; 5,6,7,8-tetrahydro-2-hydroxy-3-naphthoic acid; alkyl $(C_4-C_9)$-5,6,7,8-tetrahydro-2-hydroxy-3-naphthoic acid; 1-hydroxy-2-naphthoic acid; alkyl $(C_4-C_9)$-1-hydroxy-2-naphthoic acid; 5,6,7,8-tetrahydro-1-hydroxy-2-naphthoic acid; hydroxy bis[3,5-tertiary butyl salicylic] aluainate; hydroxy bis [3,5-tertiary butyl salicylic] alurniinate mono-, di-, tri-or tetrahydrates; hydroxy bis [salicylic]aluminate; hydroxy bis[monoalkyl salicylic] aluminate; hydroxy bis[dialkyl salicylic]aluminate; hydroxy bis[trialkyl salicylic]aluminate; hydroxy bis[tetraalkyl salicylic]aluminate; hydroxy bis[hydroxy naphthoic acid] aluminate; hydroxy bis[monoalkylated hydroxy naphthoic acid]aluminate; bis[dialkylated hydroxy naphthoic acid] aluminate wherein alkyl preferably contains 1 to about 6 carbon atoms; bis[trialkylated hydroxy naphthoic acid] aluminate wherein alkyl preferably contains 1 to about 6 carbon atoms; bis[tetraalkylated hydroxy naphthoic acid] aluminate wherein alkyl preferably contains 1 to about 6 carbon atoms; bis(3,5-di-tertiary-butyl salicto) manganese, bis(3,5-di-isopropyl salicto) manganese, and bis(3,5-methoxy salicto) manganese; alkyl$(C_4-C_9)$salicylic acids; 3,5-dialkyl$(C_4-C_9)$salicylic acids, 2-hydroxy-3-naphthoic acid; alkyl$(C_4-C_9)$-2-hydroxy-3-naphthoic acids; 5,6,7,8-tetrahalogen-2-hydroxy-3-naphthoic acids, salicylic acid; alkyl$(C_1-C_{12})$ salicylic acid; 3,5-dialkyl$(C_1-C_{12})$ salicylic acid; 1-hydroxy-2-naphthoic acid; 2-hydroxy-3-naphthoic acid; 2-hydroxy-1-naphthoic acid; alkyl$(C_3-C_{12})$-hydroxy- 3-naphthoic acid; 6-(alpha-methylbenzyl)-2-hydroxy-3-naphthoic acid; n-dodecenyl succinic acid; isododecenyl succinic acid; n-dodecyl succinic acid; isododecyl succinic acid; isooctyl succinic acid; n-octyl succinic acid; n-butyl succinic acid; and the esters thereof; maleic acid; fumaric acid; mesaconic acid; citraconic acid; itaconic acid; glutaconic acid; phthalic acid; isophthalic acid; terephthalic acid; cyclohexanedicarboxylic acid; succinic acid; adipic acid; sebacic acid; malonic acid; a dimer of linolenic acid; and the lower alkyl esters thereof; 1,2,4-benzenetricarboxylic acid; 1,2,5-benzenetricarboxylic acid; 1,2,4-cyclohexanetricarboxylic acid; 2,5,7-naphthalenetricarboxylic acid; 1,2,4-naphthalenetricarboxylic acid; 1,2,4-butanetricarboxylic acid; 1,2,5-hexanetricarboxylic acid; 1,3-dicarboxy-2-methylcarboxy propene, 1,3-dicarboxy-2-methyl-2-methylcarboxy-propanetetra (methylenecarboxy) methane, enpol trimeric acid; and the anhydrides thereof.

As previously stated, virtually any metal having the proper valence may be used to bond with the acid group to create a metal salt and form a flow-modifying agent in accordance with the invention. Series IA metals that may be used are sodium, potassium, rubidium, cesium, and francium; series IIA metals that may be used are beryllium, magnesium, calcium, strontium, and barium; series IIIA metals that may be used are scandium, yttrium, lanthanum and actinium; series IVA metals that may be used are titanium and zirconium; series VA metals that may be used are vanadium, niobium and tantalum; series VIA metals that may be used are chromium, molybdenum, and tungsten; series VIIA metals that may be used are manganese, technetium and rhenium; series VIIIA metals that may be used are iron, ruthenium, osmium, cobalt, rhodium, iridium, nickel, palladium and platinum; series IB metals that may be used are copper, silver and gold; series IIB metals that may be used are zinc and cadmium; series IIIB metals that may be used are gallium, indium and thallium series IVB metals that may be used are silicon, germanium, tin lead; series VB metals that may be used are arsenic, antimony and bismuth; series VIB metals that may be used are selenium, tellurium and polonium.

The following examples describe compositions of the present invention and methods of preparation. Unless otherwise indicated in the following examples or elsewhere in the specification or claims, all parts and percentages are by weight, temperatures are in degrees centigrade and pressures are at or near atmospheric.

EXAMPLE 1

To create a sample of treated pigment, 100 grams of Pigment Red 269 (dry weight) as presscake was dispersed in 1000 grams of water using a high speed stirrer. The pH of the slurry was adjusted to 10.0 using dilute caustic soda solution while stirring 2.5 grams of beta oxy naphthoic acid as 2.5% solution in water containing 0.6 grams caustic soda was added. After adequate stirring 10% aluminum chloride solution was added drop by drop to adjust the pH to 6.2–6.4. The stirring was continued until the pH was stabilized.

The above pigment slurry was filtered and washed until the wash water was free of chloride ions. The filtered pigment was then dried and pulverized. The treated and untreated pigments were evaluated in a typical styrenated acrylic resin based water ink. Preparation of the water vehicle involved adding the following and mixing thoroughly:

| | |
|---|---|
| Joncryl 61 (from S. C. Johnson) = | 227.0 part. |
| Colloid 999 (defoamer) = | 17.0 part. |
| Diethylene Glycol = | 83.0 part. |
| Water = | 1373.0 part. |

Preparation of the Inks:

Two inks were prepared for comparison purposes wherein one included Red 269 pigment made according to Example 1 and the other included untreated (ie., not including a flow modifier) Red 269 pigment. The inks were prepared using a standard method as follows:

In a 8 oz glass jar, add:

| | |
|---|---|
| Pigment = | 15.0 grams |
| Water vehicle = (as described above) | 85.0 grams |
| Glass beads = | 200.0 grams |

This combination was mixed for 90 minutes on Red Devil shaker. The inks were then tested by comparing the drawdowns made on Leneta form 3NT-3 using #5 Meyer Rod in a manner known to those skilled in the art. The ink including the flow modifier had a significantly lower viscosity than the ink including the untreated pigment:

| | Ink Including Untreated Pigment | Ink Including Pigment Treated in Accordance With Example 1 |
|---|---|---|
| Gloss | Equal | Equal |
| Transparency | Equal | Equal |
| Viscosity | 480 cps | 190 cps |

(Note: cps = centipoise. As used herein, "equal" means that the results were the same for both inks The ink including the untreated pigment turned thixotropic (i.e., after 24 hours it turned into a gel), while the ink including the treated pigment did not turn into a gel, maintained its low viscosity and relatively uniform disperson of pigment.

EXAMPLE 2

To create a sample of treated pigment, 100.0 parts of Pigment Red 22 (dry weight) as presscake was dispersed in 1000 parts water using a high speed stirrer. The pH of the slurry was adjusted to 10.0 using dilute caustic soda solution. To this slurry 2.5 parts of beta oxy naphthoic acid as 2.5% solution in water containing 0.6 part caustic soda was added while stirring. After adequate stirring 10% aluminum chloride solution was added drop by drop to adjust the pH to 6.2–6.4. After the pH was stabilized the slurry was filtered and washed until the wash water was free of chloride ions. The filtered pigment was dried and pulverized.

Treated and untreated Pigment Red 22 were evaluated in a S.S. nitrocellulose ink vehicle (which comprises 35% S.S. nitrocellulose in a blend of methanol, isopropanol, ethyl alcohol and N. propyl acetate).

Preparation of inks:

| | |
|---|---|
| Pigment | 20.0 parts |
| nitrocellulose vehicle | 30.0 parts |
| Ethyl alcohol | 30.0 parts |
| N-propyl acetate | 20.0 parts |
| Glass beads | 200 grams |

The above inks were mixed on a Red Devil shaker for 90 minutes. Drawdowns of the above inks were made on Leneta form 3NT-3 using #5 Meyer's Rod in a manner known to those skilled in the art. The results showed that the ink including the flow modifier had a significantly lower viscosity than the ink including the untreated pigment:

| | Ink Including Untreated Pigment | Ink Including Pigment Treated in Accordance With Example 2 |
|---|---|---|
| Transparency | Equal | Equal |
| Gloss | Equal | Equal |
| Viscosity | 960 cps | 220 cps |

The treated ink maintained its lower viscosity.

EXAMPLE 3

Example 1 was repeated but, instead of β oxy naphthoic acid, the same amount of sodium salicylic acid was used as a flow modifier. The results were similar to those disclosed in Example 1.

EXAMPLE 4

Example 2 was repeated but, instead of β oxy naphthoic acid, the same amount of the sodium salt of pamoic acid was used as a flow modifier. The nitrocellulose ink including the pigment of example 4 had considerably lower viscosity than ink including an untreated pigment.

Having now described a preferred embodiment, alterations and modifications that do not depart from the spirit of the invention will occur to those skilled in the art. The invention is thus not limited to the preferred embodiment but is instead set forth in the appended claims and legal equivalents thereof.

What is claimed is:

1. A pigment for use in printing inks or paints, the pigment including:
    (a) an organic pigment not including a metal complex; and
    (b) a flow-modifying agent which is either a metal salt of an aromatic hydroxy carboxylic acid or a metal salt of an aromatic carboxylic acid.

2. A rheology-modified ink comprising:
    (a) an ink vehicle;
    (b) an organic pigment not including a metal complex; and
    (c) a flow-modifying agent, the flow-modifying agent being either a metal salt of an aromatic hydroxy carboxylic acid or a metal salt of an aromatic carboxylic acid.

3. The ink of claim 2 wherein the ink vehicle is water-based.

4. The ink of claim 2 wherein the ink vehicle is solvent-based.

5. The ink of claim 2 wherein the pigment is a monoazo pigment.

6. The ink of claim 2 wherein the pigment is a disazo pigment.

7. The ink of claim 2 wherein the pigment is a β-naphthol pigment.

8. The ink of claim 2 wherein the pigment is a naphthol AS pigment.

9. The ink of claim 2 wherein the pigment is a benzimidazolone pigment.

10. The ink of claim 2 wherein the pigment is a isoindolinone pigment.

11. The ink of claim 2 wherein the pigment is a isoindoline pigment.

12. The ink of claim 2 wherein the pigment is a phthalocyanine pigment.

13. The ink of claim 2 wherein the pigment is a quinacridone pigment.

14. The ink of claim 2 wherein the pigment is a perylene pigment.

15. The ink of claim 2 wherein the pigment is a perinone pigment.

16. The ink of claim 2 wherein the pigment is a diketopyrrolo pyrrole pigment.

17. The ink of claim 2 wherein the pigment is a thioindigo pigment.

18. The ink of claim 2 wherein the pigment is a anthrapyrimidine pigment.

19. The ink of claim 2 wherein the pigment is a flavanthrone pigment.

20. The ink of claim 2 wherein the pigment is a pyranthrone pigment.

21. The ink of claim 2 wherein the pigment is a anthanthrone pigment.

22. The ink of claim 2 wherein the pigment is a dioxazine pigment.

23. The ink of claim 2 wherein the pigment is a quinophthalone pigment.

24. The ink of claim 2 wherein the flow-modifying agent includes a series IA metal.

25. The ink of claim 2 wherein the flow-modifying agent includes a series IIA metal.

26. The ink of claim 2 wherein the flow-modifying agent includes a series IIIA metal.

27. The ink of claim 2 wherein the flow-modifying agent includes a series IVA metal.

28. The ink of claim 2 wherein the flow-modifying agent includes a series VA metal.

29. The ink of claim 2 wherein the flow-modifying agent includes a series VIA metal.

30. The ink of claim 2 wherein the flow-modifying agent includes a series VIIA metal.

31. The ink of claim 2 wherein the flow-modifying agent includes a series VIIIA metal.

32. The ink of claim 2 wherein the flow-modifying agent includes a series IB metal.

33. The ink of claim 2 wherein the flow-modifying agent includes a series IIB metal.

34. The ink of claim 2 wherein the flow-modifying agent includes a series IIIB metal.

35. The ink of claim 2 wherein the flow-modifying agent includes a series IVB metal.

36. The ink of claim 2 wherein the flow-modifying agent includes a series VB metal.

37. The ink of claim 2 wherein the flow-modifying agent includes a series VIB metal.

38. The ink of claim 2 wherein the flow-modifying agent includes substituted or unsubstituted pamoic acid.

39. The ink of claim 2 wherein the flow-modifying agent includes substituted or unsubstituted salicylic acid.

40. The ink of claim 2 wherein the flow-modifying agent includes substituted or unsubstituted naphthoic acid.

41. The ink of claim 2 wherein the acid group is an aralkyl compound.

42. A rheology-modified ink comprising:

(a) an ink vehicle;

(b) an organic pigment selected from the group consisting of: monoazo, disazo, β-naphthol, naphthal AS, benzimidazolone, isoindoline, phthalocyanine, quinacridone, perylene, perinone, diketopyrrolopyrrole, thioindigo, anthrapyrimidine, flavanthrone, pyranthrone, anthanthrone, dioxazine, and quinophthalone; and (c) a flow-modifying agent, the flow-modifying agent being either a metal salt of an aromatic hydroxy carboxylic acid or a metal salt of an aromatic carboxylic acid.

43. A rheology-modified paint comprising:

(a) a paint vehicle;

(b) a pigment selected from the group consisting of: monoazo, disazo, β-naphthol, naphthal AS, benzimidazolone, isoindoline, phthalocyanine, quinacridone, perylene, perinone, diketopyrrolopyrrole, thioindigo, anthrapyrimidine, flavanthrone, pyranthrone, anthanthrone, dioxazine, and quinophthalone; and (c) a flow-modifying agent, the flow-modifying agent being either a metal salt of an aromatic carboxylic acid or an aromatic carboxylic acid.

* * * * *